(12) United States Patent
Ugolini

(10) Patent No.: US 9,591,871 B2
(45) Date of Patent: Mar. 14, 2017

(54) MACHINE FOR PRODUCTS SUCH AS ICE CREAMS, GRANITA OR FROZEN BEVERAGES

(75) Inventor: Marco Corrado Ugolini, Milan (IT)

(73) Assignee: Ugolini SPA (IT)

( * ) Notice: Subject to any disclaimer, the term of this patent is extended or adjusted under 35 U.S.C. 154(b) by 223 days.

(21) Appl. No.: 13/819,541

(22) PCT Filed: Jul. 21, 2011

(86) PCT No.: PCT/IB2011/053245
§ 371 (c)(1),
(2), (4) Date: Feb. 27, 2013

(87) PCT Pub. No.: WO2012/032425
PCT Pub. Date: Mar. 15, 2012

(65) Prior Publication Data
US 2013/0152620 A1    Jun. 20, 2013

(30) Foreign Application Priority Data
Sep. 6, 2010 (IT) .............................. MI2010A1608

(51) Int. Cl.
*A23G 9/00* (2006.01)
*A23L 3/36* (2006.01)
(Continued)

(52) U.S. Cl.
CPC .................. *A23L 3/36* (2013.01); *A23G 9/12* (2013.01); *A23G 9/227* (2013.01)

(58) Field of Classification Search
CPC . A23G 9/12; A23G 9/227; A23G 9/04; A23G 9/05; A23G 9/06; A23G 9/07;
(Continued)

(56) References Cited

U.S. PATENT DOCUMENTS 2,541,814 A * 2/1951 Gaddini ................. A23G 9/106
366/213
3,094,154 A * 6/1963 Daniels .......................... 141/88
(Continued)

FOREIGN PATENT DOCUMENTS

JP    10-286066    10/1998
JP    11253105 A    9/1999
(Continued)

OTHER PUBLICATIONS

"International Search Report dated Jan. 13, 2012 for PCT/IB2011/053245, from which the instant application is based," (3 pgs.).

*Primary Examiner* — Len Tran
*Assistant Examiner* — Ana Vazquez
(74) *Attorney, Agent, or Firm* — Fredrikson & Byron, P.A.

(57) ABSTRACT

A machine for producing and dispensing products such as ice cream, frozen beverages or granita has a transparent product container which is provided with a tap for dispensing the product and which contains an evaporator of a refrigerating circuit or cooling the product in the container and a mixer element for stirring the product. The machine is configured for diffusing a thin stream of moving air over the outer walls of the container. The machine may have a fan which emits an air flow inside a diffuser element which is arranged above the container and which defines a mouth around the top of the container and blows downwards the thin stream of air onto the outer walls of the container. The diffuser element may be advantageously formed in the lid the container.

11 Claims, 4 Drawing Sheets

(51) Int. Cl.
*A23G 9/12* (2006.01)
*A23G 9/22* (2006.01)

(58) Field of Classification Search
CPC ... A23G 9/08; A23G 9/09; A23G 9/10; A23G 9/11; A23G 9/28; A23G 9/22; A23G 9/224; A23L 3/36
USPC .............. 62/342, 426, 354, 136, 343, 1, 68; 222/146.6, 108
See application file for complete search history.

(56) References Cited

U.S. PATENT DOCUMENTS

| | | | |
|---|---|---|---|
| 4,070,957 A * | 1/1978 | Korekawa et al. | 99/455 |
| 4,522,041 A | 6/1985 | Menzel | |
| 4,656,056 A * | 4/1987 | Leuenberger | 427/213 |
| 4,900,158 A | 2/1990 | Ugolini | |
| 5,363,746 A | 11/1994 | Gordon | |
| 6,026,988 A * | 2/2000 | Teetsel et al. | 222/88 |
| 6,058,721 A * | 5/2000 | Midden et al. | 62/136 |
| 2008/0016893 A1 | 1/2008 | Hayase et al. | |
| 2012/0258227 A1* | 10/2012 | Kadyk et al. | 426/524 |

FOREIGN PATENT DOCUMENTS

| | | |
|---|---|---|
| JP | 2004-057160 | 2/2004 |
| WO | 03082022 A1 | 10/2003 |

* cited by examiner

MACHINE FOR PRODUCTS SUCH AS ICE CREAMS, GRANITA OR FROZEN BEVERAGES

RELATED APPLICATIONS

This application is a 35 U.S.C. 371 national stage filing from International Application No. PCT/IB2011/053245 filed Jul. 21, 2011 and claims priority to Italian Application No. MI2010A001608 filed Sep. 6, 2010, the teachings of which are incorporated herein by reference

FIELD OF THE INVENTION

The present invention relates to a machine for producing and dispensing products such as ice creams, granita or frozen beverages, of the type comprising a container, generally made of transparent plastic, containing the product in a visible manner and housing a cooling evaporation cylinder around which a motor-driven mixer element rotates.

BACKGROUND

Especially in the case of products such as ice cream or alcohol-based granita, where the temperature inside the container is kept at several degrees below zero (for example at about −8° C.), ice may form (owing to condensation) on the outer wall of the container, since the container which is made of transparent plastic does not provide a high degree of heat insulation.

This ice formation results in various drawbacks of both a practical and an aesthetic nature. Machines with improved heat insulation of the container could overcome the problem, but this results in an unacceptable increase in the cost of the container and creates problems of internal visibility which worsen the appearance of the product to the purchaser.

JP11253105 describes a twin-container machine where it is attempted to prevent the formation of ice between the containers due to the fact that the containers are too close to each other. An air flow is therefore emitted from the bottom of the machine upwards into the gap between the containers in order to keep it free from ice. This does not deal with or solve the problem of formation of ice on the free walls of the container and also produces an unacceptable amount of condensate which falls into the air emission slits against the air flow.

BRIEF SUMMARY OF EMBODIMENTS OF THE INVENTION

The general object of the present invention is to provide a machine of the abovementioned type which effectively prevents or reduces the problem of ice formation on the outside of the container, while maintaining an acceptable cost and appearance.

In view of this object the idea which has occurred according to the invention is to provide a machine having means for diffusing an air flow as claimed in claim 1. Advantageously, the said air diffusion means comprise a fan which emits an air flow inside a diffuser element which is arranged above the container and which defines a mouth around the top of the container and blows downwards a thin stream of air onto the outer walls of the container.

In particular, the diffuser element may be advantageously formed by a lid for closing the top of the container, which defines internally an air flow diffusion chamber and which has a bottom edge spaced from the side wall of the container so as to form peripherally the said mouth around the container, communicating with the said diffusion chamber.

BRIEF DESCRIPTION OF DRAWINGS

In order to illustrate more clearly the innovative principles of the present invention and its advantages compared to the prior art, an example of embodiment applying these principles will be described below, with the aid of the accompanying drawings. In the drawings.

DETAILED DESCRIPTION OF EMBODIMENTS OF THE INVENTION

Figure 1:
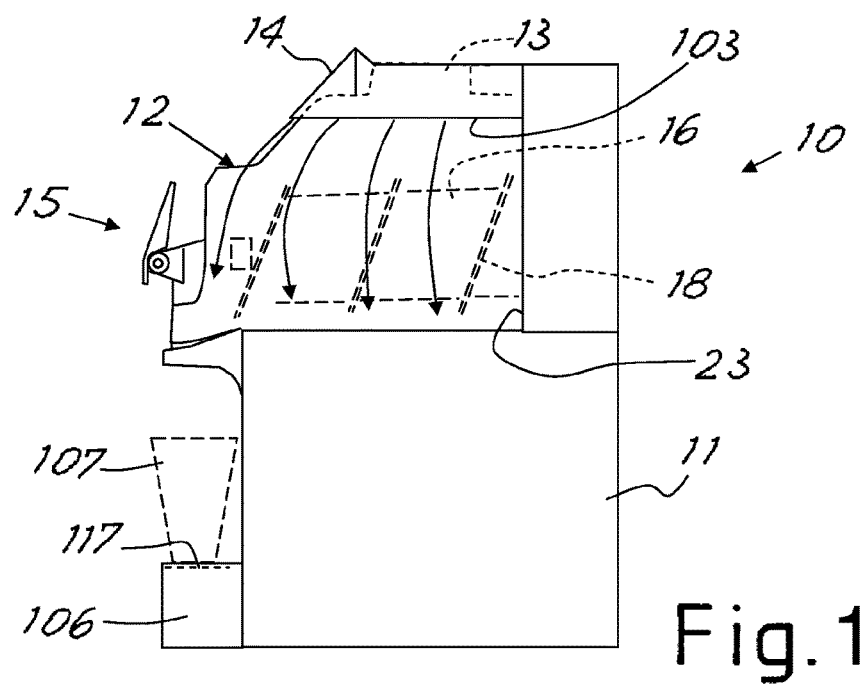
FIG. 1 shows a schematic side elevation view of a machine according to the invention.

With reference to the figures, FIG. 1 shows a machine, denoted generally by 10, for producing and dispensing ice creams, frozen beverages, granita and the like. The machine 10 comprises a base 11 on which a container 12 is mounted in a visible manner (the container is usually made of transparent plastic so that the product can be seen) and has a top opening 13 which is closed by a lid 14 and has a front tap 15 for controlled dispensing of the product.

Figure 2:
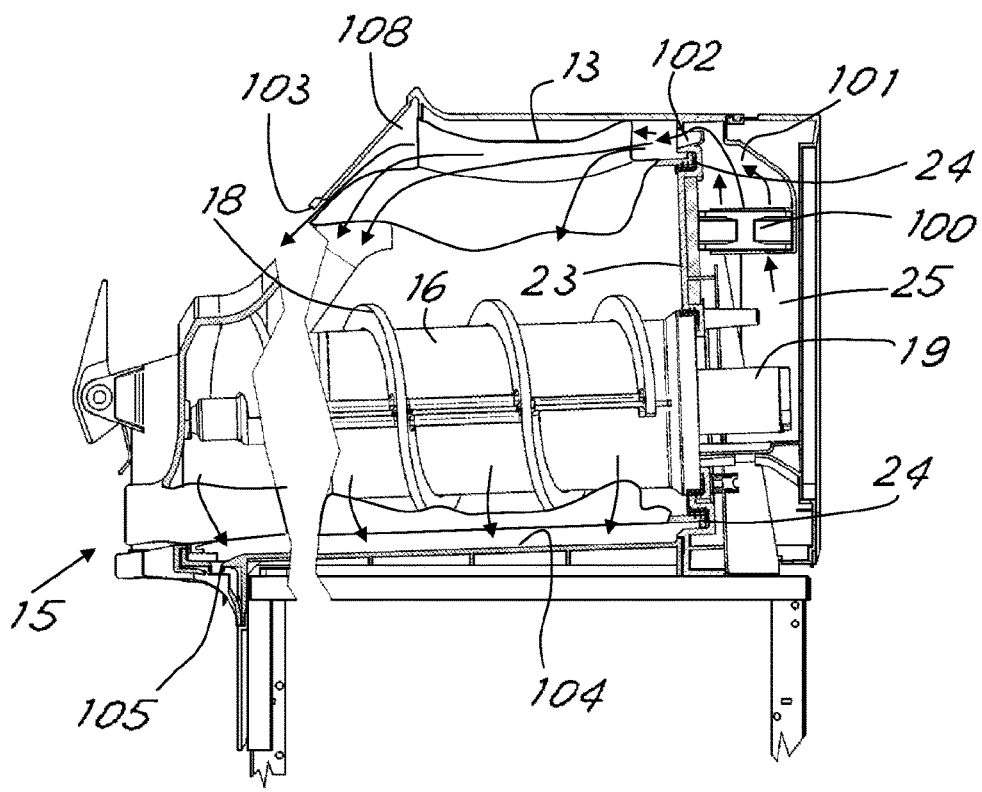
FIG. 2 shows a schematic partially sectioned view of the machine according to FIG. 1.
Figure 3:
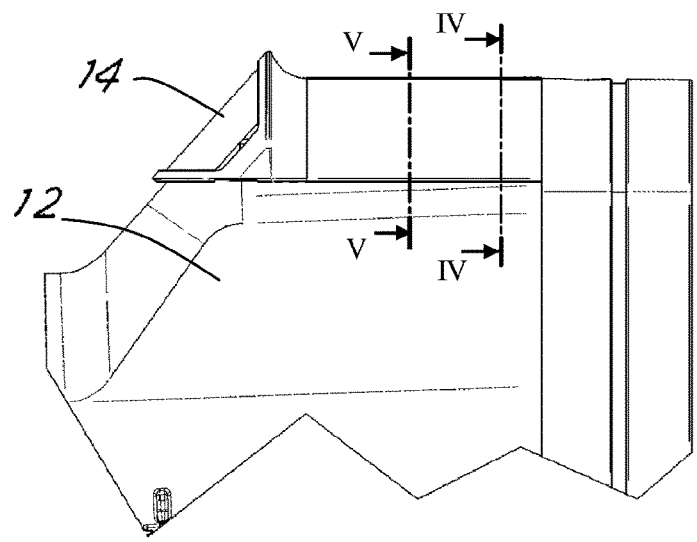
FIG. 3 shows a partial view of a top part of the machine according to FIG. 1.

As can also be seen clearly in FIG. 2, the container 12 has inside it an evaporator 16 of a refrigerating circuit (of the known type and therefore not described or shown in detail), the other parts of which are advantageously contained in the base 11. The evaporator is generally in the form of a hollow cylinder with a substantially horizontal axis and projects into the container from an end wall 23.

Inside the container there is also a mixer element 18 which is advantageously in the form of a cylindrical helix which surrounds the evaporator cylinder 16 and rotates coaxially therewith by means of a motor unit 19. The motor-driven mixer element is of the type known per se intended simultaneously to mix the product, assist formation and dispensing thereof and prevent the formation of incrustations on the outer wall of the cooling cylinder.

Again advantageously, the container is connected to the end wall 23 in a removable manner by means of seals 24 so that the end wall 23 (vertically projecting from the base 11) also forms the fixed rear closing wall of the container. A closed space or compartment 25 is formed behind the end wall 23 for the machine parts, such as electronic control boards, etc.

The machine 10 is equipped with means for the production of an air flow which passes over the outer wall of the container 12, advantageously from the top downwards as shown by the arrows in FIG. 1. This air flow which passes over the outer walls of the container prevents the formation of ice and, to a certain degree, also the formation of condensate. Any residual condensate (which is present in particular in the case of a very cold product), which is kept or brought into the liquid state by the air flow, is conveyed downwards along the outer wall of the container and is collected by a receiving tray or channel 104 which is present underneath the product container 12. Advantageously, the channel 104 is slightly inclined so as to convey the water to an outlet 105 arranged in the vicinity of the product dispensing zone so as to discharge the water through a grille 117 for supporting the cups 107 for the dispensed product, situated underneath the zone for dispensing the product from the tap. A container 116 for collecting any of the product which may be spilled during dispensing is normally provided underneath the grille.

The first channel 104 for collecting the condensate from the side walls of the container may be advantageously formed as part of the top surface of the base 11 or engaged with this surface.

Figure 4:
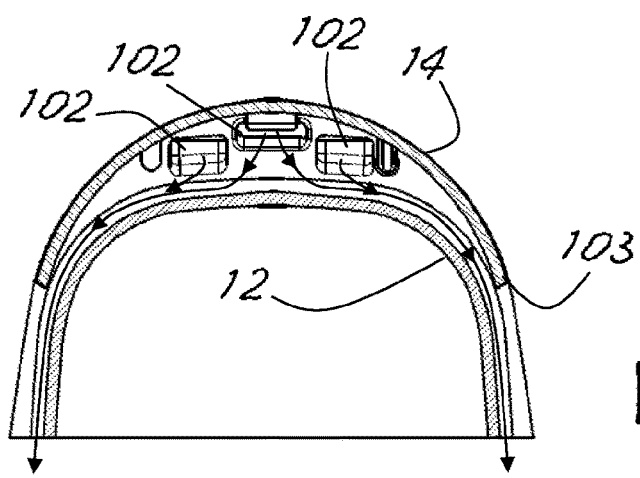
FIGS. 4 and 5 show schematic, partial, cross-sectional views of the machine along the lines IV-IV and V-V of FIG. 3, respectively.
Figure 5:
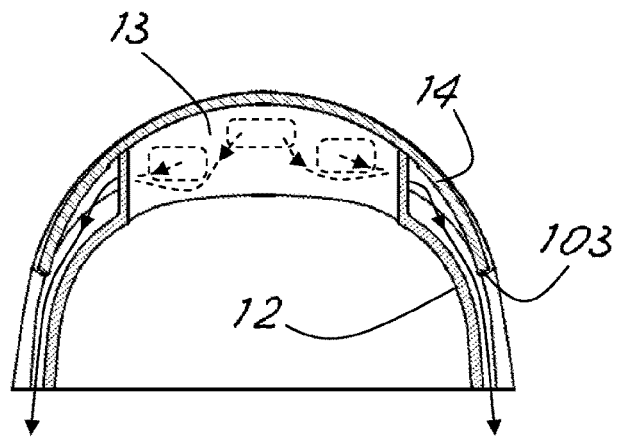

As can be clearly seen again in FIG. 2, the means which produce the air flow on the outer wall of the container 12 comprise advantageously a diffuser situated above the container and preferably formed by the said lid 14, which is suitably shaped so as to provide a space for conveying the air from a fan 100 to a circumferential bottom edge 103 which is spaced from the side walls of the container so as to form a mouth or slit around the top part of the container which acts as a passage for the said air flow, directed downwards, as can be clearly seen in the cross-sections shown in FIGS. 4 and 5. This therefore produces a thin layer of air which flows substantially parallel to the walls of the container.

The fan is advantageously arranged inside the space 25 and emits an air flow inside a conveying duct 101 which, via a labyrinth and one or more passages 102, introduces the air flow into the lid 14 which forms a chamber 108 which serves to diffuse the air around the entrance 13 of the container (which is closed by the said lid) and towards the outlet passage or mouth defined between container wall and edge 103 of the lid. In particular, the fan may draw in air from the compartment part containing the motor unit 19, so as to cool it and, at the same time, emit a flow or thin stream of slightly warm air over the container. The compartment may have inlet openings for entry of the air from the outside.

Advantageously, the passages 102 form removable inserts between the chamber 108 in the diffuser element which forms the lid and the conveying duct 101. In this way, the lid can be easily removed and the fan 100 may be housed fixed in the rear compartment, without preventing opening or removal of the container.

Figure 6:
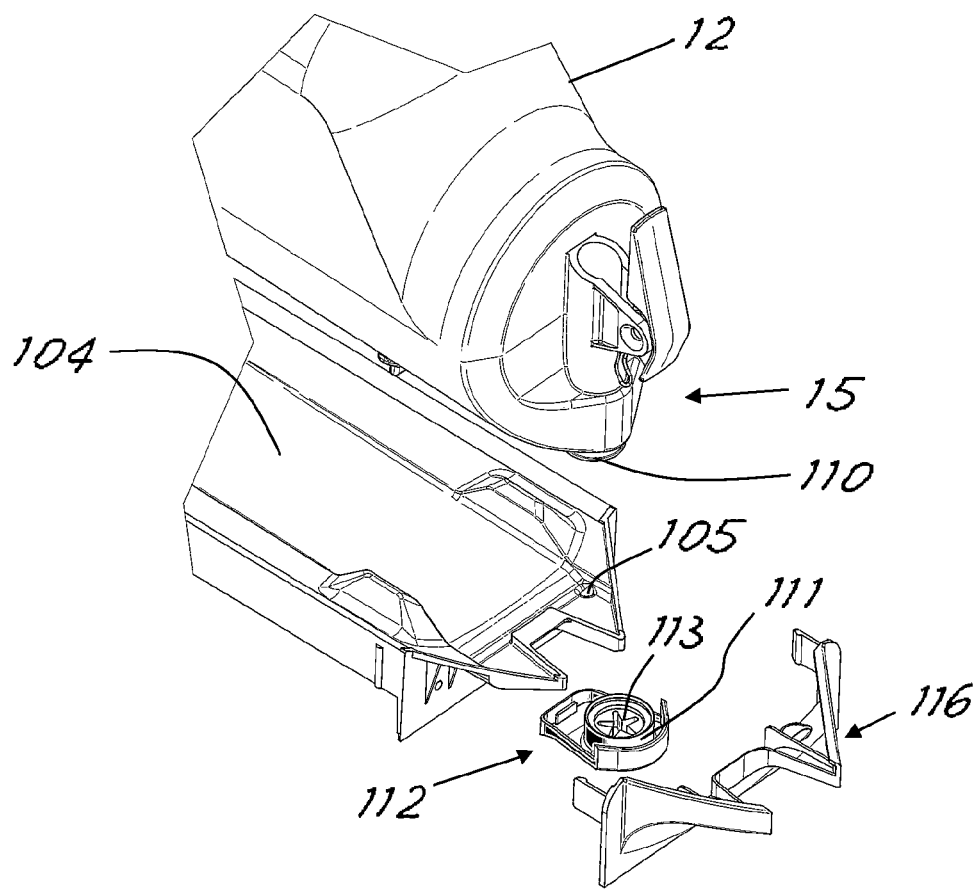
FIG. 6 shows a schematic, partial and exploded, perspective view of the front part of the machine according to FIG. 1.
Figure 7:
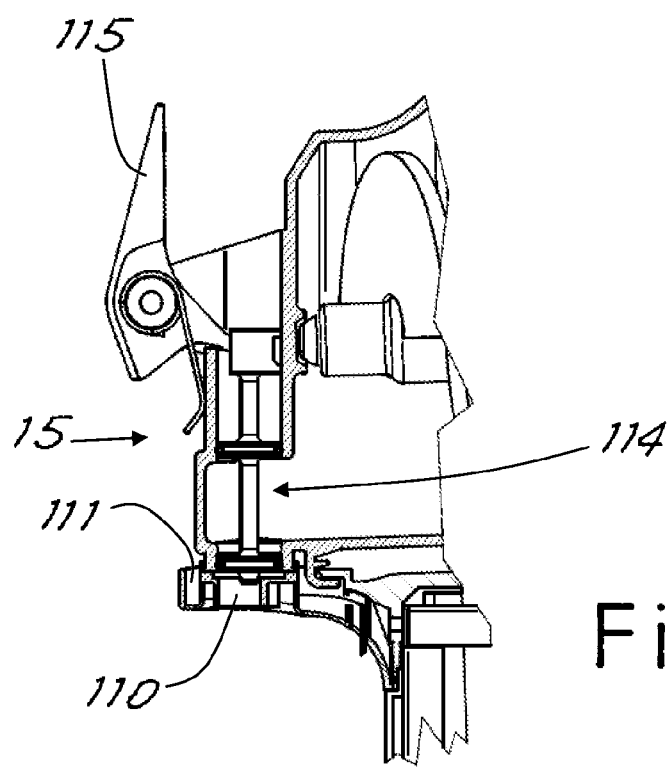
FIG. 7 shows a partially sectioned view of a zone for dispensing the product from the container in the machine according to FIG. 1.

FIGS. 6 to 7 show in greater detail an advantageous structure of the front part of the machine in the product dispensing zone. From FIG. 6 it can also be seen how the channel 104 may intercept the water condensate which flows down along the outer side walls of the container. As can be seen also in FIG. 7, a channel 111 for collecting the condensate which may form on the front part of the machine is advantageously present around the product dispensing mouth 110 of the container.

This channel 111 is advantageously formed on the edge of a part 112 which, as can be clearly seen in FIG. 6, is removably inserted in the front part of the machine and which comprises a shaped hole 113 for dispensing the product.

The part 112 may be removed both for cleaning and for replacement with other parts which are similar, but have a different shape, depending on the form which is to be given to the product which is extruded through it upon operation of the tap 15 (for example, advantageously provided with an opening piston operated by a lever 115). Extrusion of the product is facilitated by the thrust imparted by the mixing element which has a thrust axis directed towards the front of the container 12, into the zone of the dispensing mouth. This is particularly advantageous in the case of a dense product, such as ice cream.

The front part of the machine may also comprise a further profiled part 116 which is snap-engaged and has an aesthetic function as well as the function of collecting the condensate at the front.

Figure 8:
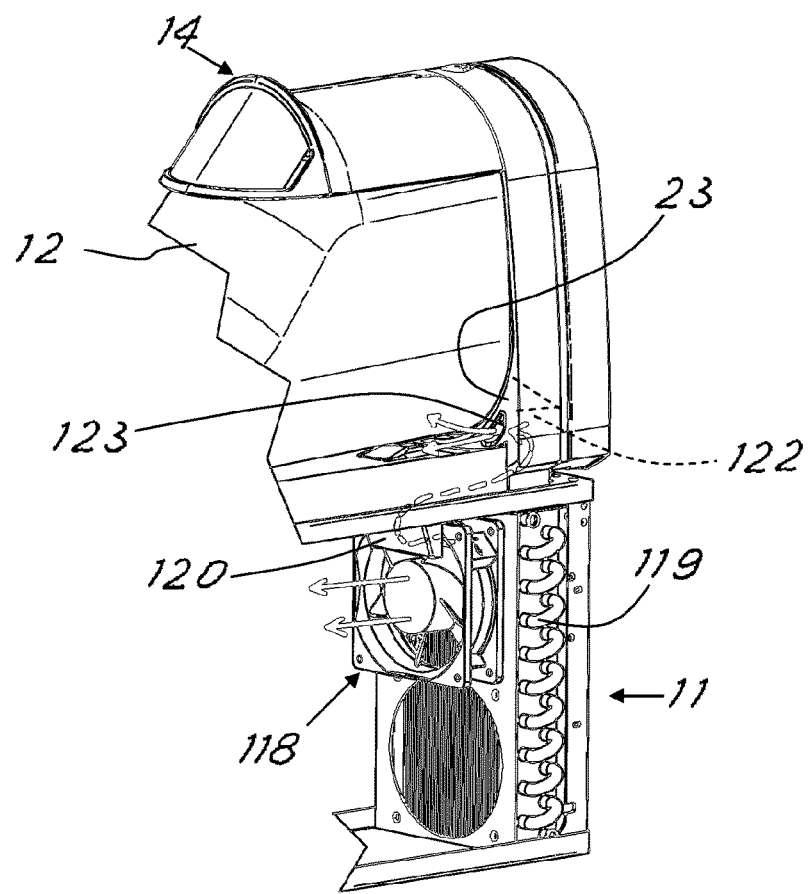
FIG. 8 shows a partial perspective view of a variant of the machine according to FIG. 1.

FIG. 8 shows a constructional variant of the machine which is useful for increasing the air flow over the outer wall of the container in the bottom side zone. In this variant, the means for diffusing moving air over the outer walls of the container comprise further nozzles 123 which emit an air flow in the vicinity of the bottom of the container.

Figure 9:
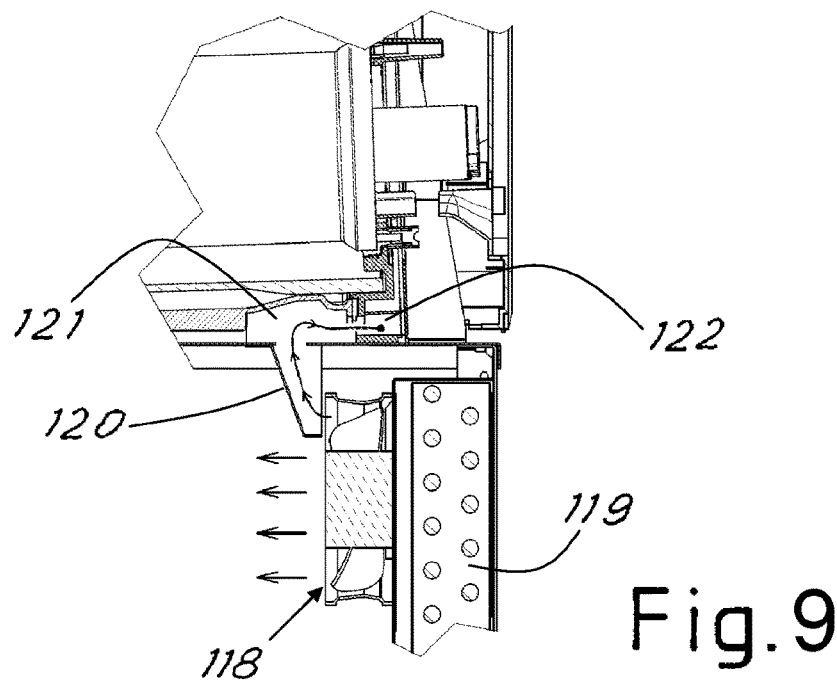
FIG. 9 is a view of a partially sectioned part of the variant of FIG. 8.

Advantageously, as can be clearly seen in FIG. 8 and in the cross-section according to FIG. 9, a fan 118 is present in the base 11 and produces an air flow towards the inside of the base. Advantageously, this fan 118 draws in the air through the condenser 119 of the normal refrigerating circuit of the machine, helping perform cooling thereof. In this way, the air flow produced is advantageously heated.

A conveyor element 120 is arranged in the flow produced at the outlet from the fan 118 so as to intercept it partially and convey it, through the ducts 121, 122 as far as the nozzles 123. These nozzles are advantageously arranged so as to open out on the end wall 23 in the vicinity of the low outer wall of the container and emit air in a direction approximately parallel to the axis of the container. FIG. 8 shows the nozzle on one side of the machine. A similar nozzle (not shown) is symmetrically arranged on the other side of the machine.

The air flow leaving the nozzles 123 is combined with the air flow produced above, thereby improving and ensuring more uniform circulation of the air over the walls of the container. Advantageously, by taking advantage of the effect due to the upwards curvature of the container, the air emitted by the nozzles in the bottom position spreads in the form of a layer of moving air along the wall of the container.

At this point it is clear how the predefined objects have been achieved. The air flow which passes over the outer wall of the container prevents the formation of ice and improves the visibility of the product. Any condensation which forms on the container is also effectively collected and discharged. The cost of the machine is not substantially increased by the presence of the air circulation means and the container may also remain substantially the same as those of the known type.

Obviously, the above description of an embodiment applying the innovative principles of the present invention is provided by way of example of these innovative principles and must therefore not be regarded as limiting the scope of the rights claimed herein. For example, the machine may also comprise further devices and known structural solutions, which are not described here for the sake of simplicity, such as improved systems for moving the product, for operating the stirring element and for fixing and removing the container. Moreover, the element for conveying the thin stream of air and the lid for the top opening of the container may also be made separately, although it has been found to be particularly advantageous to provide a single part with both the functions. A single fan may also be used for generating the air flows both from the top diffuser and from the bottom nozzles.

The invention claimed is:

1. A machine for producing and dispensing a product including at least one of ice cream, frozen beverages or granita, comprising a body on which is removably mounted a visible container for containing the product, which is provided with a tap for dispensing the product and which contains an evaporator of a refrigerating circuit for cooling the product in the container and a mixer element for stirring the product, the mixer element being driven by a motor unit housed in a compartment in the body, wherein the machine further comprises an air diffusion means for diffusing air over outer walls of the container, the air diffusion means having a diffuser element which defines at least one mouth around a top part of the container and which blows a layer of air from top downwards over the outer walls of the container so that condensation on the outer walls is reduced, the layer of air blown over the outer walls of the container being drawn from the compartment housing the motor unit and thereby cool the motor unit;

wherein the diffuser element is formed by a removable lid closing the top part of the container and which defines internally a diffusion chamber for diffusion of the moving air, wherein the lid has a bottom edge which is spaced from a side wall of the container so as to define peripherally the at least one mouth around the container which is communicating with the diffusion chamber and wherein the diffusion chamber has an inlet on a side of the lid and the inlet is connected to a passage in the body when the lid closes the top part of the container; and wherein the air diffusion means comprise a fan, wherein the fan is in the compartment housing the motor unit and emits through the passage an air flow inside the diffusion chamber.

2. The machine according to claim 1, further comprising a channel defined underneath the container, the channel configured for collecting condensate which flows along the outer walls of the container.

3. The machine according to claim 2, wherein the channel has a discharge outlet leading into a grille arranged underneath a zone for dispensing the product from the tap.

4. The machine according to claim 1, further comprising a channel arranged around a dispensing mouth of the tap, the dispensing mouth configured for collecting and conveying to a discharge outlet condensate which flows down an outer front zone of the container in a vicinity of the tap.

5. The machine according to claim 1, wherein the evaporator is in the form of a cylinder with a substantially horizontal axis, which projects into the container from a rear wall, wherein the mixer element is configured to rotate on the cylinder along an axis coaxial with the substantially horizontal axis of the cylinder.

6. The machine according to claim 5, wherein rotation of the mixer element is provided via means of the motor unit at least partially housed inside the compartment of the machine.

7. The machine according to claim 6, wherein the fan draws in air from a part of the compartment which houses the motor unit.

8. Machine according to claim 1, wherein the air diffusion means comprise nozzles, the nozzles configured for emitting an air flow in vicinity of bottom of the container.

9. Machine according to claim 8, wherein the evaporator is in the form of a cylinder with a substantially horizontal axis, which projects into the container from a rear wall, wherein the mixer element rotates on the cylinder along an axis coaxial with the substantially horizontal axis of the cylinder, wherein the nozzles are arranged so as to open out on said rear wall of the container.

10. Machine according to claim 8, wherein underneath the container, there is a base which houses a fan, the fan configured for producing an air flow which is at least partially intercepted by a conveyor element configured to convey the air flow to the nozzles.

11. Machine according to claim 10, wherein the fan is configured to draw air through a condenser of the refrigerating circuit.

* * * * *